United States Patent [19]

Antonazzi

[11] 4,449,409
[45] May 22, 1984

[54] PRESSURE MEASUREMENT SYSTEM WITH A CONSTANT SETTLEMENT TIME

[75] Inventor: Frank J. Antonazzi, South Bend, Ind.

[73] Assignee: The Bendix Corporation, Southfield, Mich.

[21] Appl. No.: 282,977

[22] Filed: Jul. 13, 1981

[51] Int. Cl.³ .............................................. G01L 9/12
[52] U.S. Cl. ........................................ 73/724; 73/708; 361/283
[58] Field of Search ................. 73/701, 708, 718, 724, 73/862.61, 517 B; 307/308; 328/173, 175; 361/283; 324/60 C, 61 R; 346/31, 32

[56] References Cited

U.S. PATENT DOCUMENTS

| | | | |
|---|---|---|---|
| 3,520,318 | 7/1970 | Oberle | 328/175 |
| 3,595,084 | 7/1971 | Bailey | 73/718 |
| 4,226,125 | 10/1980 | Waugh | 73/708 |
| 4,250,452 | 2/1981 | Gray et al. | 307/308 |
| 4,322,977 | 4/1982 | Sell et al. | 73/708 |

*Primary Examiner*—Jerry W. Myracle
*Assistant Examiner*—Brian R. Tumm
*Attorney, Agent, or Firm*—William A. Marvin; Ken C. Decker

[57] ABSTRACT

The invention provides a pressure measurement system with a substantially constant settlement time. The invention includes a closed loop pressure measurement system having an input impedance configuration and a feedback impedance configuration where a signal from the feedback impedance configuration is used to null or balance a signal from the input impedance configuration. The error between the signals is integrated in a digital integrator to generate a measurement of the sensed parameter. The invention further comprises a means for varying the feedback loop gain of the system as a function of pressure in a manner to compensate for the gain change produced in the system in response to a pressure change.

12 Claims, 12 Drawing Figures

PRESSURE MEASUREMENT SYSTEM WITH A CONSTANT SETTLEMENT TIME

The invention pertains generally to a pressure measuring system with a constant settlement time and is more particularly directed to a closed loop pressure measuring system with a variable impedance in the feedback loop.

In the field of pressure measurement there are many devices known to provide an advantageous transduction of pressure into an electrical signal. These pressure transducer systems generally include a pressure sensitive element that modulates an electrical characteristic of the transducer with respect to changes in pressure. The variances in the electrical characteristic, which for example, may be a resistance, inductance, capacitance, or a similar parameter, are thereafter demodulated by an electrical circuit to generate an electrical signal as a function of the measured pressure.

One particularly advantageous pressure measuring system is described in a copending and commonly assigned U.S. Application Ser. No. 153,129, now U.S. Pat. No. 4,322,977, entitled "Pressure Measuring System", filed on May 27, 1980, in the names of Robert C. Sell, John R. Sheler, and John M. Juhasz. The disclosure of Sell et al. is hereby expressly incorporated by reference herein.

Another advantageous pressure measuring system is disclosed in a copending and commonly assigned U.S. Application Ser. No. 244,184, entitled "Differential Pressure Transducer", filed on Mar. 16, 1981, in the names of Frank J. Antonazzi and Joseph A. Bluish. The disclosure of Antonazzi, et al. is hereby expressly incorporated by reference herein.

Yet another advantageous pressure measuring system is disclosed in a copending and commonly assigned U.S. Application Ser. No. 280,578, entitled "Pressure Ratio Measuring System" filed on July 6, 1981 in the name of Frank J. Antonazzi. The disclosure of Antonazzi is hereby expressly incorporated by reference herein.

In the above referenced applications the measuring systems incorporate a closed loop feedback system that yields a digital output. The loop comprises a configuration of pressure sensitive impedances inputting a signal current to a summing junction as a function of the measured parameter. The summing junction generates an error signal as the difference of the input signal and a feedback signal. The error signal is amplified and processed by appropriate filters and an integrator. The integrator provides an output which is used to excite a configuration of feedback impedances connected in a negative feedback loop to another input of the summing junction. The output current or feedback signal from the feedback impedance configuration is utilized to null or balance the current from the input configuration and is thus a measure of the sensed parameter when the summing junction output is zero.

Additionally, the feedback loop includes a digital counter for the direct measurement of the number of discrete increments of feedback signal necessary to null the output of the summing junction. The digital readout of the counter is thereby directly proportional to the value of the desired parameter and a measurement thereof.

The settlement time of the system, or the time it takes to null the error current and produce a measurement, is a function of the gain of the loop. Ideally, the settlement time and therefore the gain should be substantially constant over the range of the pressure measurement. It has been observed that the settlement time of the above referenced systems varies over their measurement range. Therefore, it is highly desirable that a method for providing a constant settlement time for these systems be found.

SUMMARY OF THE INVENTION

The invention provides a pressure measurement system with a substantially constant settlement time. The invention includes a closed loop pressure measurement system having an input impedance configuration and a feedback impedance configuration where a signal from the feedback impedance configuration is used to null or balance a signal from the input impedance configuration. The error between the signals is integrated in an integrator to generate a measurement of the sensed parameter. The invention further comprises a means for varying the feedback loop gain of the system as a function of pressure in a manner to compensate for the gain change produced in the system in response to a pressure change.

The system, therefore, maintains a substantially constant loop gain with respect to pressure and thus a predetermined settlement time. An advantage of the invention is that the predetermined constant gain can be chosen to yield the fastest system settlement time available without oscillation. A variable gain system will produce a sluggish response at some pressures and a oscillatory response at others. Another advantage of a predetermined settlement time in a measurement system interfacing with a larger digital system is that of polling efficiency. The measurement system can be given a signal to begin a pressure measurement and thereafter the control processor will know, after expiration of the predetermined settlement time, that the parameter measurement is ready for input. With a measurement system having a variable settlement time, the control processor would have to wait a period equal to the longest settlement time of the measurement system.

In the preferred embodiment of the invention, an absolute pressure measuring system includes a quartz capacitive capsule, having a pressure sensitive capacitor and a relatively pressure insensitive reference capacitor, as the feedback impedance configuration. This feedback impedance configuration will vary as a function of pressure because of the pressure sensitive capacitor and therefore, will vary the gain of the feedback loop to change the settlement time of the system. The feedback gain varying means modifies the feedback gain inversely to the change produced by the feedback impedance configuration to produce a relatively constant settlement time.

The feedback gain varying means preferably includes means for changing the gain of the integrator as a function of pressure. The gain of the integrator is a factor of the feedback loop gain equation and changes therewith. The integrator gain is advantageously modified because the output of the integrator is directly proportional to pressure and can be compared against the known impedance vs. pressure characteristic of the feedback impedance configuration to determine a compensation factor. For each timing increment of the integrator, the compensation factor is then multiplied by the previous gain of the integrator to generate a new gain. Thus, the integrator gain is changed inversely to the gain change produced in the loop by the feedback configuration at the particular pressure being measured. These changes then cancel each other so that the gain and hence settlement time of the loop remains substantially constant.

For the preferred embodiment, the feedback loop gain increases for increasing pressure because of the decrease in the feedback impedance with respect to pressure. To compensate for this change, the feedback gain varying means begins with a multiplicative factor of one at the lowest measured pressure to establish a nominal gain. The gain varying means then decreases the multiplicative factor as a function of pressure or integrator output to maintain the loop gain constant. The function of pressure that is preferably used is a linear approximation of the inverse of the impedance vs. pressure characteristic of the feedback configuration.

These and other objects, features, and aspects of the invention will be more clearly understood and better described if a reading of the detailed description is undertaken in conjunction with the appended drawings wherein:

DETAILED DESCRIPTION OF THE PREFERRED EMBODIMENT

Figure 1:
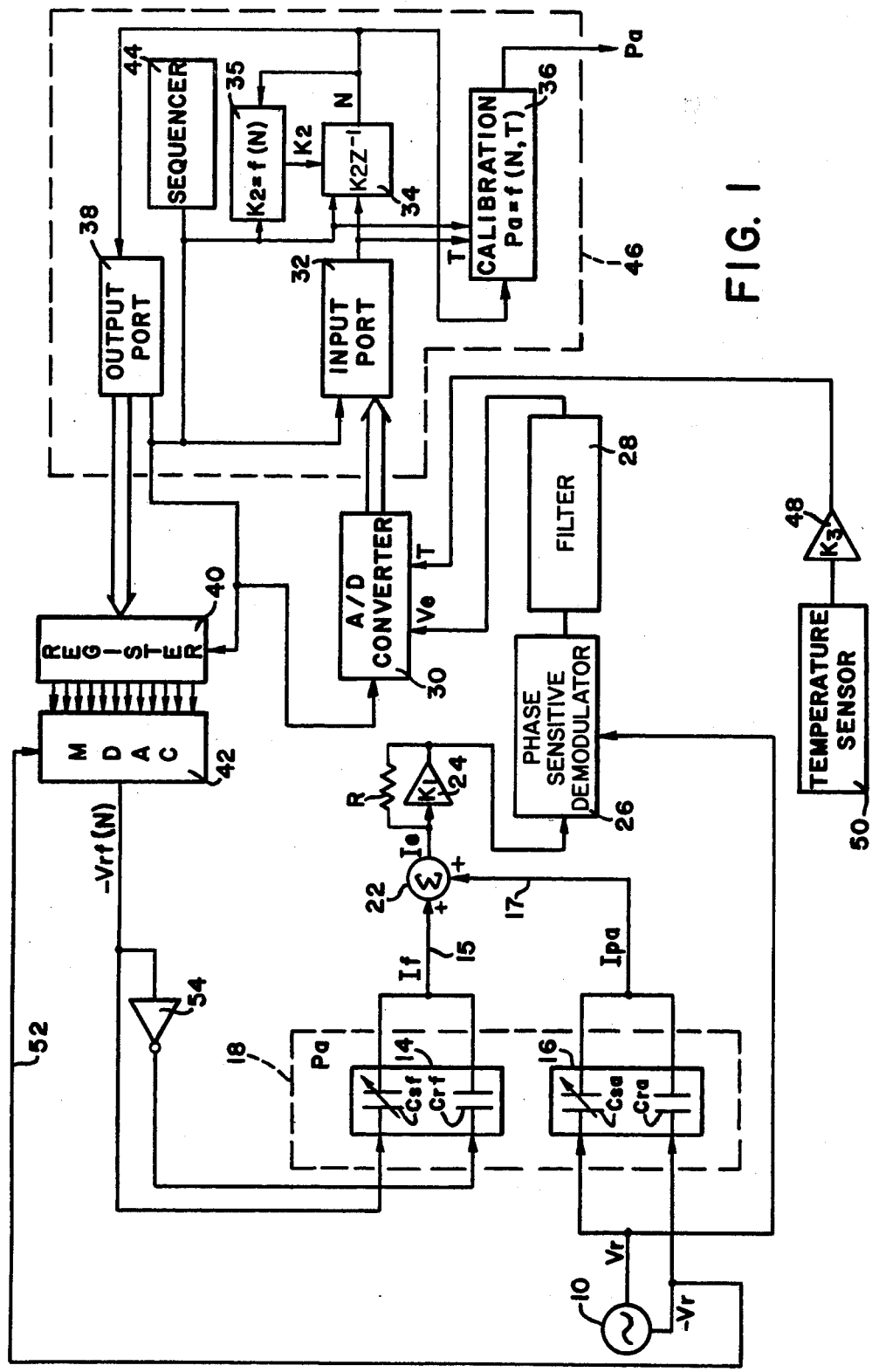
FIG. 1 is a system block diagram of a pressure measuring system constructed in accordance with the invention.

The pressure measurement system with a constant settlement time constructed in accordance with the teaching of the invention will now be more fully described with reference to FIG. 1. The measuring system shown there is an absolute pressure measuring system similar to that illustrated in Sell, et al. Therefore, the system operates to generate a steady state digital number N which is a function of a measured pressure Pa.

The invention has been included as a feature of the system to improve the settlement time of the measurement by compensating for gain changes in the feedback loop.

The system illustrated includes an alternating frequency generator 10 which generates alternating excitation signals Vr, —Vr at a certain frequency and amplitude. The excitation signals Vr, —Vr are preferably of the same amplitude and frequency but of opposite phase. The signals could, for example, be generated by a sinusoidal generator connected to the primary of a transformer having a secondary winding with a grounded center tap. The signal Vr would then be generated between one pole of the secondary winding and the center tap while the signal —Vr would be generated between the other pole of the secondary winding and the center tap.

The excitation signals feed a first pressure sensing capsule 16. The pressure sensing capsule 16 comprises a pressure sensitive capacitance Csa and a relatively pressure insensitive capacitance Cra. Preferably the capsule 16 is a quartz capacitive transducer as will be more fully described, hereinafter. The capacitances of capsule 16 are fed out of phase such that the excitation signal Vr is fed to the pressure sensitive capacitor Csa and the excitation —Vr, 180° out of phase with the former excitation, is fed to the relatively pressure insensitive capacitor Cra. The pressure sensitive capacitor Csa when fed by the excitation Vr develops a current proportional to its capacitance and likewise the reference capacitor Cra when fed by the excitation —Vr develops a current proportional to its capacitance. These currents are differenced in the lead 17 because of their opposite polarities to become a current Ipa which is thereafter input to a summing junction 22. It is readily evident that if Csa and Cra are equivalent at an initial reference pressure, then the output current Ipa from the lead 17 will be zero. However, when Csa changes with variances in pressure, the current Ipa will be generated proportional to the change in the capacitance value in Csa due to the variances in the pressure Pa.

The current Ipa is input to the summing junction 22 and differenced with a feedback current If to form an error current Ie. The conversion of the error current Ie into a digital number respecsentative of pressure is obtained by closing a loop around summing junction 22 and calculating the amount of feedback current If that will be necessary to null the error current Ie or balance the measurement current Ipa. The resolution of the system in the digital domain is made by incrementally varying the feedback current If and counting the number of increments necessary for balance to determine the pressure Pa.

To accomplish this, the error current Ie is transmitted to a current-to-voltage amplifier 24 where it is multiplied by a gain KL. The amplitude of the alternating voltage, representing the magnitude of the error is thereafter fed to a phase sensitive demodulator and filter 26, 28 which additionally has an input reference signal Vr from the generator 10. The error voltage output from amplifier 24 is thereby demodulated and filtered into a DC voltage with an amplitude proportional to the error signal.

The DC voltage Ve is thereafter input to one port of a multiplexing analog to digital (A/D) converter 30. Another input for a second port of the A/D converter 30 is an analog temperature signal, T, from a temperature sensor 50. The temperature signal, T, is transmitted to the A/D converter 30 after amplification by amplifier 48 having a gain of K3. The temperature sensor generates the temperature signal indicative of the ambient temperature of the environment in which the system is operating. The temperature sensor is preferably located in physical proximity to the pressure chamber 18.

The A/D converter 30 transforms these analog signals input to its ports into digital numbers to be input to a digital processor, preferably a microprocessor, illustrated as block 46. A sequencer 44 which can be embodied as hardware or software controls the operation of the processor 46. The processor 46 could be included as part of a larger control unit or be a separate element. The digital numbers are input to the processor 46 through an input port 32 under the supervision of sequencer 44.

The two digital signals representative of error and temperature are necessary to determine the pressure by a calibration mapping routine as will be more fully described hereinafter. The digital form of the error signal contains information as to the sign and magnitude of the error. The sign of the error indicates the direction in which the feedback current must be changed to balance or null the system while the magnitude of the error informs the system of the amount the feedback current must change to be in balance. This digital error signal can be any bit length required for the designed resolution of the system. The digital form of the temperature signal, T, is generally of any required bit size and contains information as to the magnitude of the ambient temperature.

The input port further communicates the error to a digital integrator 34 with a gain of K2. The integrator 34 can be implemented as an internal processor register whose size of incrementation is a function of the magnitude of the error signal and the gain K2. The gain K2 is varied as a function of N by a function generator 35 for each incrementation. The function generator 35 varies the integrator gain K2 inversely to the gain change of the feedback loop gain with respect to pressure as will be more fully described hereinafter. The gain change in K2 is made by varying the size of the incrementation of the integrator as a function of N for each pass through the loop.

Additionally, the input port transmits the digital input signal T to a calibration mapping routine 36. The output of the digital integrator, which is a digital number N, is fed back to the summing junction 22 through an output port 38 under supervision of the sequencer 44 to a register 40. The sequencer 44, communicates with the input port 32, output port 38, A/D converter 30, function generator 35, calibration circuit 36, and register 40, to synchronize the process of inputting and outputting the digital numbers N.

The digital number N stored in the register or latch 40 is thereafter converted to an analog alternating signal by a multiplying digital-to-analog converter (MDAC) 42. The MDAC 42 receives as another input $-Vr$ from the reference generator 10 via lead 52. Depending on the digital number N input, the MDAC 42 will output an alternating excitation signal $-Vrf(N)$ which has a frequency equivalent and phase inverse to that of the reference Vr and an amplitude which is a function of N. Consequently, a feedback excitation signal is generated in phase with the reference $-Vr$ and of an amplitude proportional to the digital number N.

The feedback excitation signal, $-Vrf(N)$, is applied to a second pressure sensing capsule 14. The capsule includes a pressure sensitive capacitance Csf, and a relatively pressure insensitive reference capacitance Crf. The capacitance Csf is fed in phase with the feedback excitation and capacitance Crf is fed 180° out of phse with the feedback excitation by means of an inverting amplifier 54. The current generated by Csf is differenced with the current generated by Crf in lead 15 to form the feedback current If. In this manner the feedback current If is generated proportional to the difference in capacitances (Csf−Crf) and the amplitude of the feedback excitation f(N). The feedback current If is increased or decreased incrementally by the counting of the digital integrator 34 until the loop is balanced and the error current Ie is nulled.

Figure 6:
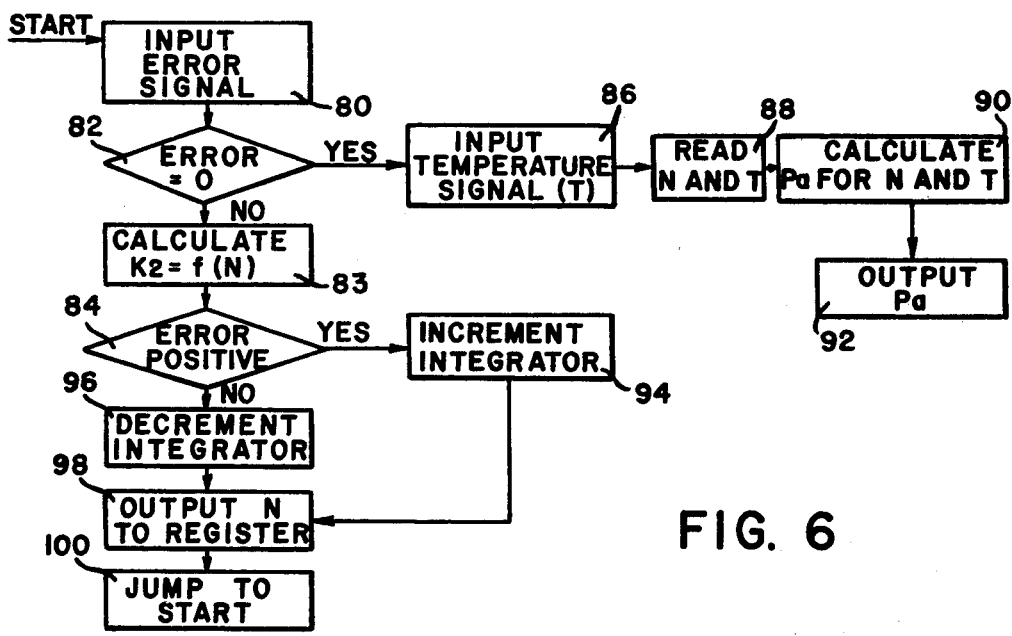
FIG. 6 is an illustrative system flow chart of the steps utilized in the feedback loop of the pressure measurement system illustrated in FIG. 1.

The flow chart illustrated in FIG. 6 will now be used to further describe the conversion of the error signal into a digital number N. This flow chart represents the functional steps of a program stored in and executed by sequencer 44 for converting the measured pressure Pa into a digital number N. The program can be a part of a major control program where it is called as a subroutine or a separate stand alone block where the result is output directly to a control unit. The initiation of the sequence can be started periodically or at the polling command of a larger processor.

The sequence of process steps begins by inputting the error signal as defined by block 80. This is accomplished by signaling the A/D converter 30 that the DC error signal Ve from filter circuit 28 should be converted to a digital number. After the conversion, the output of the A/D converter is transferred to a register internal to the processor for storage by means of the input port 32.

The error signal in digital form which has a magnitude and sign is thereafter tested during process steps 82 and 84. The error signal is first tested in block 82 to determine if its magnitude is greater than zero. If non zero, then the digital number N is not indicative of the pressure signal and the loop has not settled.

If the loop has not settled, then the integrator will have to be incremented or decremented. The size of the increment or the gain K2 of the integrator to be used is now calculated in block 83. The present value of the digital number (N) is used to calculate the new value of gain. This provides a calculation of the gain K2 as a function of pressure since the digital number N varies as a function of pressure. The particular function of pressure used for this system will be more fully described hereinafter.

The loop is now ready to be incremented using the new gain term K2. Therefore, an indication of which direction to increment the number N must be found. The test accomplished in block 84 provides this indication. If the error signal is positive, then the error current Ie is larger than the feedback current If and integrator 34 is incremented using K2 in step 94 to increase the feedback current. If the error signal is negative, then the error current Ie is less than the feedback current If and integrator 34 is decremented by K2 in step 96 to decrease the feedback current.

After step 94 or 96 is finished, a new digital number N will be output to register 40 through the output port 38 during step 98. The number N is fed back to vary the error current in a direction to null the loop through the MDAC 42 and feedback capacitance (Csf−Crf). This process is continued by jumping to block 80 from block 100 after the number N is output.

The program will continue to vary the feedback current by increments in this manner until the error current is nulled. When this occurs, the sequence will flow from the test in block 82 to block 86. At this time the sequencer 44 will signal A/D converter 30 to convert the output of the temperature sensor 50 into a digital number. The temperature signal T will then be input through the input port 32 and stored. This step in the sequence is illutrated as block 86. The system will now begin a calibration cycle where the stored values of N and T are read during step 88 and the corresponding pressure value Pa found from a calculation accomplished by block 90.

The calculation step can be accomplished by one of two alternative methods. In the first, a look-up table of the values of the number N, pressure Pa, and temperature T is composed empirically. An initial calibration is formed by exposing the system to a matrix of known pressures and temperatures and recording the digital number N produced for each point. Each point is placed in a memory element such as a read only memory (ROM) to form a look-up table. The look-up table may then be used to find the pressure Pa which corresponds to the measured values for N and T during gas turbine engine operation. If necessary an interpolation routine can be used to find the pressure between two empirical points.

Figure 12:
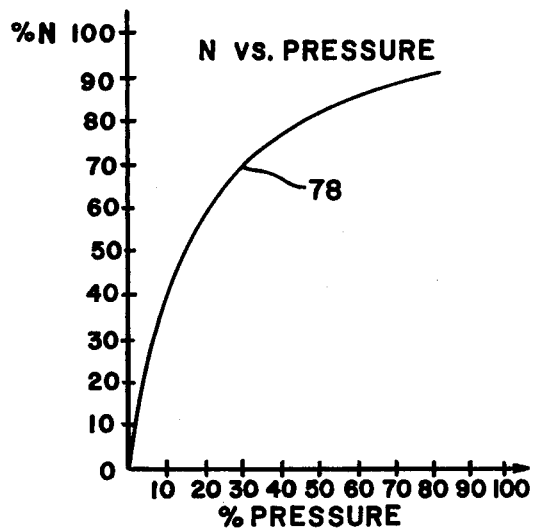
FIG. 12 is a graphical representation of steady state values of percent N number as a function of percent pressure for the system illustrated in FIG. 1.

An alternate method is to derive, from the calibration data for known pressures and temperatures, an equation for the pressure Pa as a function of the variables N and T. Then to obtain an indication of an unknown pressure, this equation can be executed in the software loop to convert the measured parameter N and T to a representation of the unknown pressure. Pressure Pa is thereafter output during step 92 to be directly used by a control unit or for use in a larger program or processor. A representative calibration characteristic of N versus P is illustrated in FIG. 12.

While a digital software implementation of the feedback loop has been described for indicating the preferred embodiment of the invention, it will be obvious to one skilled in the art that the feedback circuitry illustrated in the referenced Sell et al. application could just as easily be used. In such an instance, the feedback circuitry illustrated in FIG. 4 of that application as elements 14, 16, 26, and 28, could be readily substituted for the digital loop to take the error current Ie and convert it into a feedback signal $-V_r f(n)$. Moreover, the system loop could also be implemented in a totally analog configuration. In that case the loop would include analog amplification, demodulation, and integration to output an analog output signal representative of the pressure. The feedback loop would utilize an analog multiplier controlled by the output signal to null the loop.

Since the system in the steady state is essentially configured as an operational amplifier (pure amplifier with an infinite gain) the system transfer function for the output N can be envisioned as substantially equivalent to: $N = X_f/X_m \, N_{max}$, where $X_f$ is the reactance of the feedback loop, $X_m$ is the reactance of the pressure measuring input, and $N_{max}$ is the maximum digital output from the system.

In the preferred embodiment, then:

$$X_f = \tfrac{1}{2}\pi f (C_{sf} - C_{rf})$$

$$X_m = \tfrac{1}{2}\pi f (C_{sa} - C_{ra})$$

therefore:

$$N = (C_{sa} - C_{ra})/(C_{sf} - C_{rf}) \, N_{max}$$

since $C_{sa}$, $C_{sf}$ vary with Pa; and $C_{ra}$, $C_{rf}$, are relatively fixed, then N is proportional to: Pa Nmax In Sell, et al. it was explained that the pressure sensitive feedback impedance configuration $(C_{sf} - C_{rf})$ would cause a nonlinear incrementation of the feedback current. This causes a beneficial compression of the digital numbers at the lower end of the pressure range to increase accuracy without having to increase resolution. Thus, the characteristic N vs pressure curve for the system is more fully set forth in FIG. 12.

Figure 7:
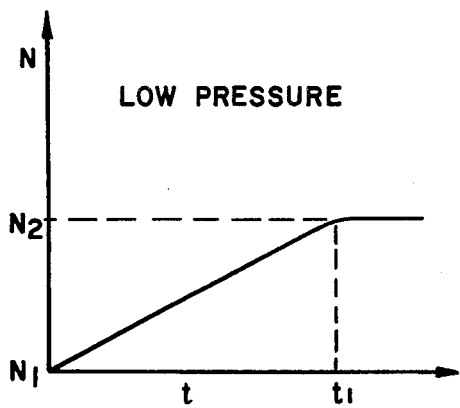
FIG. 7 is a graphical representation of the time response of the system illustrated in FIG. 1 for a low pressure condition without the invention.
Figure 8:
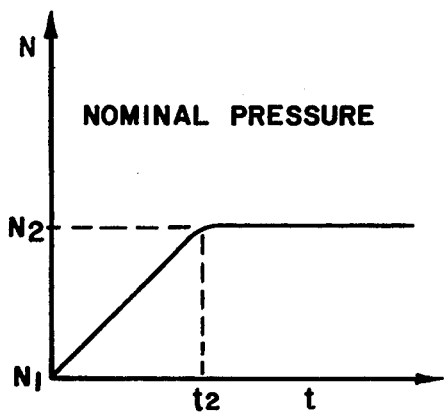
FIG. 8 is a graphical representation of the time response of the system illustrated in FIG. 1 for a nominal pressure condition without the invention.
Figure 9:
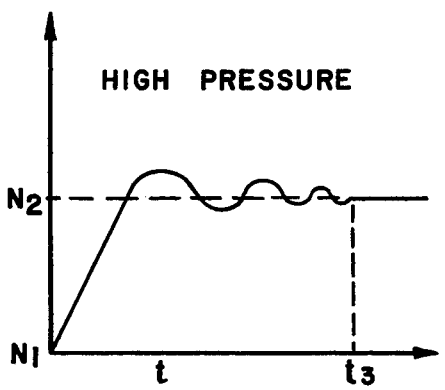
FIG. 9 is a graphical representation of the time response of the system illustrated in FIG. 1 for a high pressure condition without the invention.

With respect now to FIGS. 7, 8, and 9, there is shown a generalized response of the pressure measurement system with respect to time during settlement of the loop prior to the invention. FIG. 7 illustrates that at low pressures the settlement time of the loop, t1, as the system made a transition from N1 to N2, was long because the feedback loop gain was too low while FIG. 9 indicates at high pressures the settlement time t3 was long because the gain was too high. In the first instance the low gain of the loop caused a slow rise of the system from N1 to N2 while in the second instance a high gain caused overshoot of the settlement point N2 and an oscillation that had to damp out before a meaningful pressure could be read. Only at a nominal pressure such as that shown in FIG. 8 was the settlement time t2 optimum because of the correct feedback gain. It is noted that the settlement time of the system is dependent upon the gain and is therefore variable with respect to pressure. A larger control system dependent upon this pressure measurement system must wait until the loop has settled before taking the measurement. With a variable gain, the larger control system would have to wait the longest period that it would take the loop to settle for every reading. The invention solves this problem by making the loop gain substantially constant with respect to the pressure range so that not only can the settlement time be optimized but also become a predetermined quantity which a larger system can depend on when polling.

To further explain the invention, the loop gain equation must be examined. Returning to FIG. 1, an expression for the loop gain can be developed as follows:

$$G = (K_L)(K_2)(K_n)$$

where G is the loop gain of the system illustrated, $K_L$ is the loop gain across amplifier 24, and $K_2$ is the gain of integrator 34, and $K_n$ is a constant gain term lumping in attenuation and gain contributions for loop components 26, 28, 30, 32, 38, 40, 42.

The gain $K_L$ is substantially equivalent to $X_a/X_f$ where $X_a$ is the reactance of the feedback of amplifier 24 and is equivalent to a fixed resistance R, and $K_f$ is the reactance of the feedback impedance configuration and is equivalent to $\tfrac{1}{2}\pi f (C_{sf} - C_{rf})$. Therefore, $K_L$ is equal to:

$$(2\pi f)(C_{sf} - C_{rf})R$$

where f is the frequency of the alternating generator 10, and $C_{sf}$, $C_{rf}$ are the capacitances of the capsule 14.

Therefore, G is proportional to:

$$(C_{sf} - C_{rf}) R (K_2)(K_n)$$

It can be seen from the proportionality that in this particular system the gain G and hence settlement time changes with respect to pressure because of the term (Csf−Crf) which varies with pressure. Therefore, the invention must vary the gain term K2 with respect to pressure inversely to the changes produced by the feedback impedance configuration to compensate for these changes. If the gain K2 is varied with respect to pressure, in an exact inverse relation to the changes in KL, then the overall gain G will remain substantially constant over the pressure range because the two changes will cancel. If the loop gain G is maintained substantially constant, then the settlement time will be a predictable constant in accordance with the object of the invention.

Figure 10:
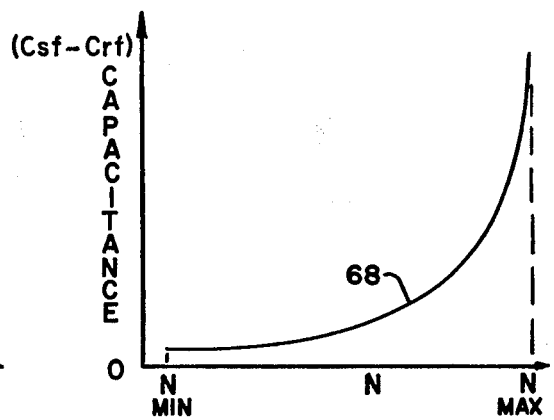
FIG. 10 is a graphical representation of capacitance as a function of N number for the feedback impedance configuration (Csf—Crf) of the system illustrated in FIG. 1.

As was previously set forth, the digital number N varies with respect to pressure and therefore, is an advantageous parameter for use in determining K2. A particular P vs N characteristic for the system is known to follow the curve in FIG. 12. In FIG. 10 the change of the capacitance term (Csf−Crf) as a function of N and hence pressure for the system is illustrated in FIG. 10.

Figure 11:
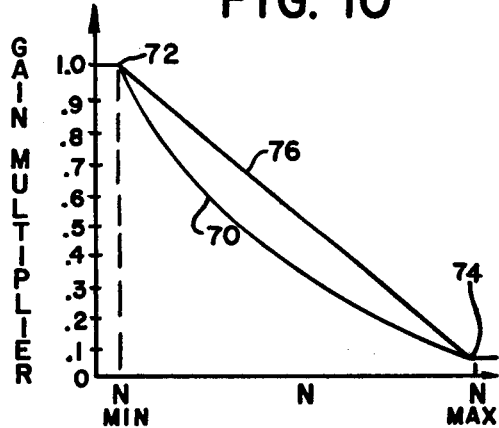
FIG. 11 is a graphical representation of the multiplier for the proportional gain of the integrator as a function of N number for the system illustrated in FIG. 1.

An inverse curve 70 of the functional curve 68 can be generated as a function of N to provide a gain multiplier. The multiplier function as is shown in FIG. 11 can be used to modify the gain at any particular N number from the minimum (Nmin) to the maximum (Nmax). The representation $\frac{1}{2}\pi f(Csf-Crf)$ is of the inverse of the particular impedance cnfiguration shown. At the minimum digital number a nominal gain KO is multiplied by a factor (f) of one. Preferably, the nominal gain is chosen as the gain that will yield optimum system response over the entire pressure range. For increasing digital numbers, the factors are inversely proportional to N and between one and zero following along values of curve 70. Thus, to determine the new gain term K2 of the system, a multiplication factor f is generated by the schedule for any particular N and then multiplied by the nominal gain KO.

An alternative method which is more facile in use is to produce a linear approximation (curve 76) of the inverse of the curve 68 and generate the gain term directly from its equation. Since the slope of the curve 76 is known and the nominal gain is set then to calculate the new gain the sequencer solves the equation.

$$K2 = -SN + B$$

where S is the slope of curve 76, N is the present digital number of the system, and B is the value of the intercept of the ordinate axis for curve 76. In this manner, only the two values of the slope, S, and intercept, B, have to be stored to generate any gain K2 between the nominal gain and the minimum gain for values of N.

In the implementation illustrated in FIG. 11, the linear approximation has been made by connecting the value of the inverse curve 70 at Nmin to the value of the inverse curve at Nmax. While this provides a useful approximation it is apparent that other linear approximation techniques can be used. Further, the inverse curve 70 can be broken into more than one piece and a piecewise linear approximation connected by breakpoints made. If this is the case, then it will be necessary to store slope and intercept information for each piece.

Figure 2:
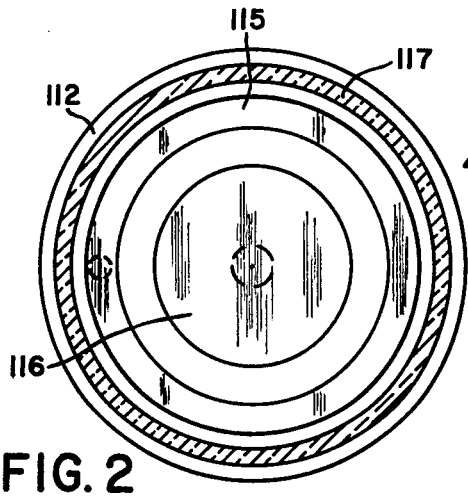
FIG. 2 is a cross sectional top view of a quartz capacitive pressure capsule as utilized in the pressure measurement system illustrated in FIG. 1.
Figure 3:
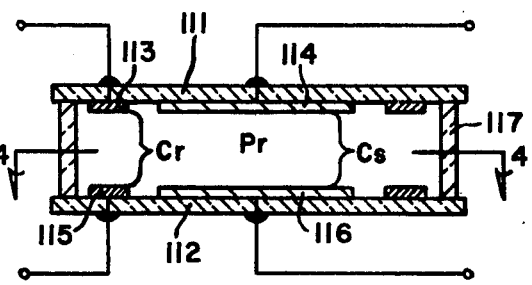
FIGS. 3 and 4 are cross sectional side views of the capsule illustrated in FIG. 2 in an unpressurized and pressurized state, respectively.
Figure 4:
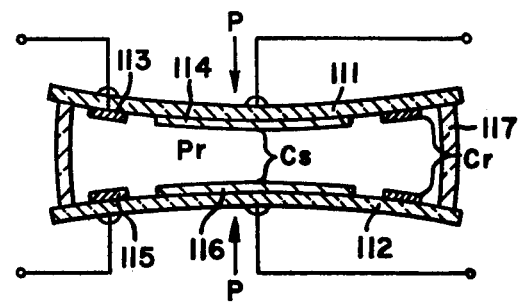

FIGS. 2, 3, and 4, illustrate the preferred implementation of the quartz capacitive capsules which are schematically shown in FIG. 1 as elements 14 and 16. Each transducer comprises two relatively flat opposing discs 111, 112, of quartz or a similar vitreous material with similar temperature and flexion characteristics. Quartz is preferable because its deflection characteristics with respect to pressure is relatively large, while changes in that characteristic with respect to temperature are relatively insignificant.

On the inner face of each disc, for example, disc 112, there is formed two capacitor plates 115 and 116 of some conductive material by a screening or vapor deposition process or the like. Preferably, the plates are comprised of a noble metal such as copper, gold, silver, or a similar material. Plate 116 is circular in shape and substantially centrally located on the disc while plate 115 is ring-shaped and peripherally positioned on the disc 112 surrounding the inner plate 116. After formation of the plates 115 and 116 on disc 112 and formation of similar plates 113 and 114 on disc 111, the discs are joined by an annular frit 117 along their peripheral edge to form a gap between them. The frit 117 is of an insulating material and the interior of the transducer is evacuated or set at a reference pressure Pr.

As is seen in FIGS. 3 and 4, a change in outside pressure P will cause a deformation of the discs 111, 112 and vary the gap distance between the quartz discs. This flexion varies the distance between capacitor plates 113 and 115 and thus varies the capacitance of a pressure variable capacitor Cs formed of those plates. Normally, the reference capacitor Cr formed of the plates 113 and 115 does not change capacitance appreciably and can be used for reference compensation as previously described.

Figure 5:
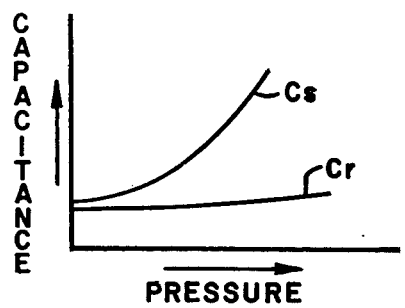
FIG. 5 is a graphical representation of the capacitance change as a function of pressure for the capsule illustrated in FIGS. 2, 3, and 4.

This operation results from the fact that the central portions of the discs are easily deflectable while the portions adjacent the edges are relatively nondeflectable. The generalized response of the transducer capsule for a change in capacitance due to a change in pressure is illustrated in FIG. 5. A capacitive pressure transducer of this type is more fully disclosed in a commonly assigned U.S. Pat. No. 3,858,097 issued to Polye, the disclosure of which is hereby expressly incorporated by reference herein.

While a detailed description of the preferred embodiments has been disclosed, it will be obvious to those skilled in the art that various modifications and changes may be made thereto without departing from the scope and spirit of the invention as is hereinafter defined in the appended claims. For example, while the Sell, et al. system has been chosen to best illustrate the operation of the invention, it is evident that the pressure measuring systems described in the referenced Antonazzi and Antonazzi, et al. applications could just as advantageously use the invention. In Antonazzi, et al. a similar feedback impedance configuration is illustrated for the second embodiment and the feedback loop gain equation is substantially identical. In Antonazzi the feedback impedance configuration varies with respect to pressure similar to the present application without the reference capacitance, Crf, while the feedback loop gain equation is also substantially identical but without Crf. For either of these configurations the settlement time can be made substantially constant by varying the feedback gain with respect to pressure inversely to the gain change produced by the feedback impedance configurations as is taught by the present application.

What is claimed is:

1. A pressure measuring system including a pressure sensitive input impedance configuration fed by at least a first alternating reference signal, a pressure sensitive feedback impedance configuration fed by a second alternating reference signal 180° out of phase with the first alternating reference, means for differencing the outputs of the input and feedback impedance configurations to produce an error signal, means for incrementing a digital signal N at a predetermined rate while the error is non zero, and means for feeding said digital signal N to said feedback impedance configuration to generate a feedback signal to null the error signal wherein the improvement comprises:

means for maintaining the time it takes for nulling the error signal substantially constant, said maintaining means having means for varying the feedback signal inversely to changes in gain generated by the measuring system.

2. A pressure measuring system as defined in claim 1 wherein said feedback signal varying means includes:

means for varying the feedback loop gain as a function to pressure.

3. A pressure measuring system as defined in claim 2 wherein said pressure measuring system includes:

means for varying the gain of said digital signal incrementing means as a function of pressure.

4. A pressure measuring system as defined in claim 3 wherein:

the gain of said digital signal incrementing means is varied by changing the magnitude of the gain as a function of pressure.

5. A pressure measuring system as defined in claim 4 wherein said feedback impedance configuration comprises:

a pressure sensitive capacitor and a relatively pressure insensitive capacitor, said sensitive capacitor being fed by said second reference signal and said insensitive capacitor being fed by the 180° inversion of said second reference signal, and whose outputs are connected together such that their impedance contribution Xf to the feedback loop is:

$Xf = 1/(2\pi f(Csf - Crf))$ where f is the frequency of the second reference signal, Csf is the capacitance of sensitive capacitor, and Crf is the capacitance of the insensitive capacitor.

6. A pressure measuring system as defined in claim 5 wherein:

the function of pressure used to vary the magnitude of the increment of said digital signal is:

$K2 = 1/(2\pi f(CsF - Crf))Ko$ where K2 is the variable magnitude of the digital signal increment, and Ko is the nominal magnitude of the digital signal increment.

7. A pressure measuring system as defined in claim 6 wherein:

the function:
$1/(2\pi f(Csf - Crf)) = 1$ at N(Min), and
$1/(2\pi f(Csf - Crf)) = 0.1$ at N(Max)
where N(Min) is the minimum digital number generated by the system and N(Max) is the maximum digital number generated by the system.

8. Pressure measuring system comprising means for generating an input signal as a function of a pressure to be measured, means for generating a feedback signal, means for generating an error signal as a function of the difference between the input signal and said feedback signal, means for integrating said error signal to generate an output signal representative of the pressure to be measured, said integrating means having a variable gain, gain varying means for varying said variable gain of said integrator as a function of said output signal, said feedback signal generating means including means for generating said feedback signal as a function of said output signal and including feedback signal varying means for varying said feedback signal as a function of said pressure to be measured.

9. Pressure measuring system as claimed in claim 8, wherein said integrating means includes means for incrementing a digital signal as a function of the magnitude of the error signal and said variable gain when the value of the error signal is other than zero.

10. Pressure measuring system as claimed in claim 9, wherein said input signal generating means includes first pressure responsive means for generating said input signal as a first function of said pressure to be measured and said feedback signal varying means includes second pressure responsive means for varying said feedback signal as a second function of said pressure to be measured, said second function being a function different from said first function.

11. Pressure measuring system as claimed in claim 10, wherein said first and second pressure responsive means include pressure sensitive capacitors.

12. Pressure measuring system as claimed in claim 8, wherein said input signal generating means includes first pressure responsive means for generating said input signal as a first function of said pressure to be measured and said feedback signal varying means includes second pressure responsive means for varying said feedback signal as a second function of said pressure to be measured, said second function being a function different from said first function.

* * * * *